United States Patent Office 3,309,502
Patented Mar. 14, 1967

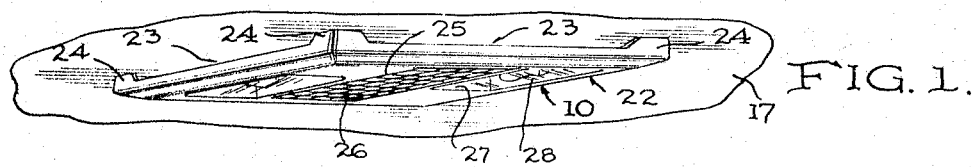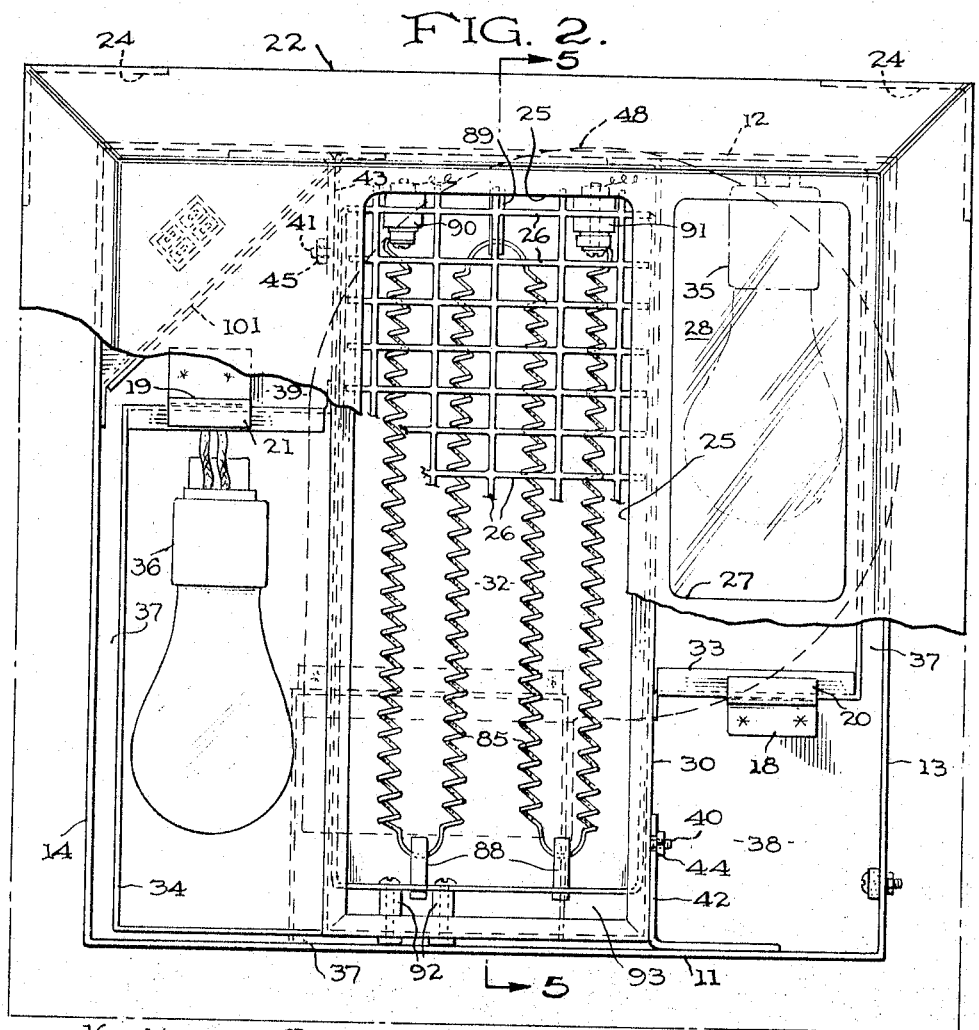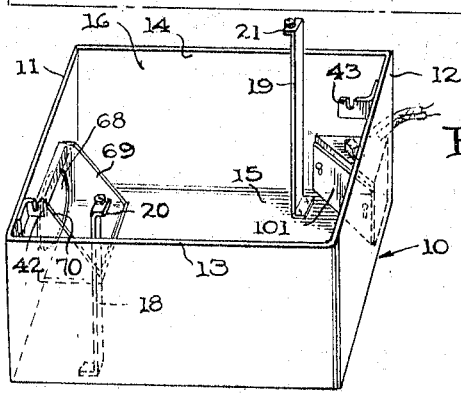

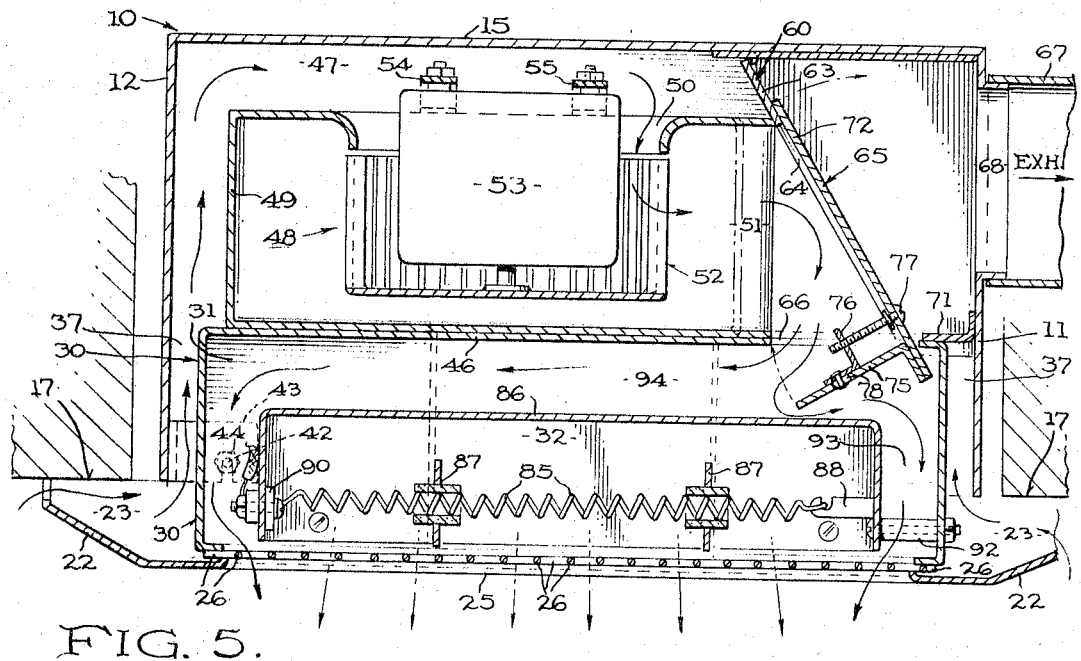
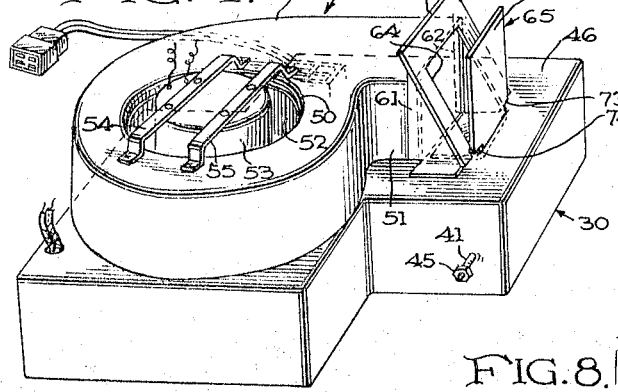
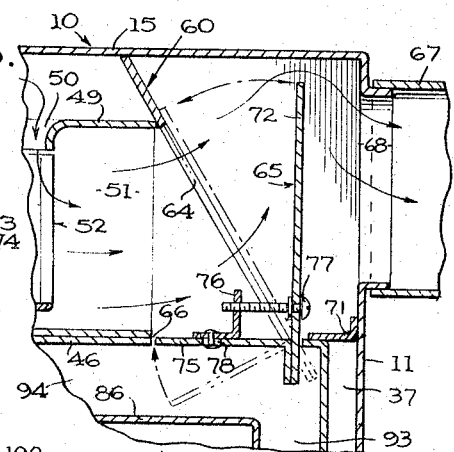
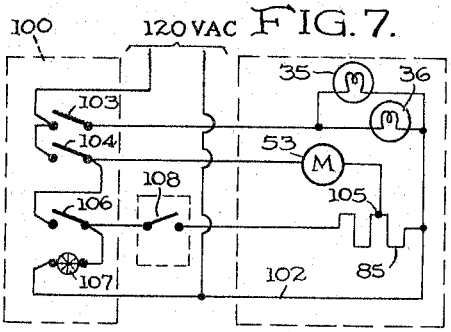
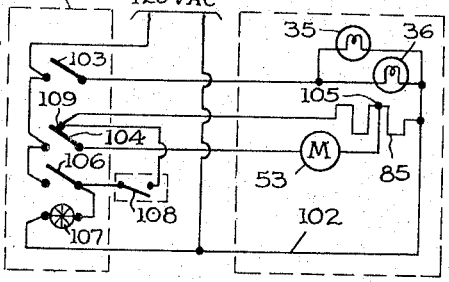

3,309,502
DAMPER CONTROL AND ASSEMBLY FOR HEATING AND VENTILATING APPARATUS
Jack Witherspoon, Jr., Knoxville, Tenn., assignor to Ceilheat, Incorporated, Knoxville, Tenn., a corporation of Tennessee
Filed Oct. 30, 1964, Ser. No. 407,775
17 Claims. (Cl. 219—369)

The present invention relates generally to heating and ventilating apparatus of the type adapted to be installed in a recess in a ceiling and more particularly to a damper control arrangement and assembly for such apparatus adapted to control the direction of air flow during the heating and ventilating periods.

Modern heating and ventilating units of this type are especially well suited for bathrooms or dressing rooms where it is desirable to provide some degree of ventilation to remove vapors and odors, and, at selected times, to provide a rapid, but safe, heating of the room. Such heating and ventilating units are generally arranged in small compact housings adapted for installation in any suitable location within the room.

Because of the compact nature of these units, they are subject to heat build-up within the housing when used for heating. It can be readily appreciated that a high concentration of heat presents a serious safety problem.

Since such heating and ventilating units normally employ a fan or blower to provide forced air circulation, several arrangements have been proposed to minimize the problem of heat accumulation within the housing; however, known arrangements for overcoming heat accumulation generally require a complicated assembly and control structure which is economically objectionable.

The present invention overcomes the above-mentioned disadvantages by incorporating in a heating and ventilating unit assembly, a novel, but simple, damper which causes the forced air flow from the blower in the heating cycle to flow past the area in the housing where a heat build-up would normally occur and carry the heated air into the room. This not only prevents any dangerous concentration of heat within the housing, but also adds to the total heating effect of the unit. The increased efficiency of the unit, in turn, enables a smaller heating element to be used than would ordinarily be possible, thus reducing the over-all operating cost for the user.

In addition, the damper control of the present invention provides a novel arrangement wherein the damper is operable in response to the forced air flow through the unit. Such an arrangement effects a considerable saving in manufacturing and operating costs by eliminating the need for costly control elements.

Accordingly, it is an object of the present invention to overcome the above-mentioned disadvantages of prior art devices and provide a novel heating and ventilating unit which is relatively simple in construction yet highly effective and efficient in operation.

Another object of the present invention is to provide a novel heating and ventilating unit which is compact in size and which effectively and efficiently eliminates any heat build-up within the unit.

A further object of the present invention is to provide a forced air heater and ventilating unit which utilizes both radiant heat and the heated air within the housing to effectively and efficiently heat the room.

Still another object of the present invention is to provide a novel damper control for a forced air heating and ventilating unit which damper control is automatically operated in response to the air flow from the motor driven fan to control the direction of flow of air through the unit.

A further object of the present invention is to provide a novel damper control which prevents circulation of cold air from the exhaust passages connected to the unit when the unit is not in operation, and automatically controls the direction of air flow through the unit during heating and ventilation.

These and other objects of the present invention will become apparent from the following detailed description of the mechanical structure and mode of operation thereof.

In carrying out the present invention, in one illustrative embodiment thereof there is provided a combined heating and ventilating unit adapted for installation in the ceiling of a room. To this end, the unit is assembled within a housing having a cover which is supported by the housing in spaced relationship to its sides so as to provide a peripheral opening through which air may be drawn into the housing. Forced circulation of air for both heating and ventilating of the room is provided by a motor driven fan mounted within the housing. For heating, a radiant heating element is positioned above the cover and arranged to radiate heat downwardly through a suitable opening provided in the cover, while heat build-up during the heating operation is avoided by forced circulation of air behind the reflector for the radiant heating element so that the heated air is passed into the room to add to the total heating effect.

A single damper element is arranged to automatically control the direction of air flow, in response to the force of the air flow, either into the room or to the exhaust conduit. To effect this automatic control without resorting to a multiwinding motor, the motor driven fan may be connected electrically in series with a portion of the heating element during the ventilating condition and electrically in parallel with the remainder of the heating element during the heating condition. By this arrangement, the motor is energized at substantially full line voltage to drive the fan at maximum motor speed for ventilating the room, and at a reduced voltage to drive the fan at a reduced speed for heating the room. When the fan is driven at the reduced speed, the force of the air flow is insufficient to so operate the damper and therefore the reduced air flow is directed into the room.

Although only one specific form of the invention is described and illustrated in the accompanying drawings, it is to be expressly understood that these drawings are for the purpose of illustration only and are not intended to represent the full scope of the invention which is defined by the appended claims.

In the drawings, wherein like reference characters indicate like parts throughout the views:

FIGURE 1 is a perspective view of the unit as installed in the ceiling of a room, showing only the cover over the opening at the underside of the housing;

FIGURE 2 is a bottom plan view of the combined heating and ventilating unit with a portion of the cover broken away;

FIGURE 3 is an inverted perspective view of the housing with the cover and unit removed;

FIGURE 4 is a perspective view of the blower and damper mounted on the internal shell with the housing and cover removed;

FIGURE 5 is a vertical longitudinal section taken along line 5—5 of FIGURE 2;

FIGURE 6 is a fragmentary cross sectional view of the damper mechanism illustrating the flow of air when the unit is energized to ventilate the room; and FIGURES 7 and 8 are schematic views of the electrical wiring for the unit.

Referring now to the drawings, and particularly to FIGURES 1-4, the heating and ventilating unit according to the invention comprises an outer housing indicated generally by the numeral 10. The housing 10 is advantageously of rectangular outline to facilitate installation between the beams of a wall or ceiling; however, it will be readily apparent that other configurations may also be utilized. The housing 10 comprises parallel side walls 11 and 12, parallel end walls 13 and 14 and a top wall 15. The housing is open at its lower side as at 16 to facilitate installation and mounting of the heating and ventilating components.

To secure the housing to the joist or other elements of the building structure, the housing is provided with suitable mounting brackets (not shown). In a preferred installation, the housing 10 is mounted with respect to the ceiling of the room so that the opening 16 of the housing faces into the room and is flush with the finished surface of the ceiling 17.

Secured to the top wall 15 of the housing 10 is a pair of sheet metal brackets 18 and 19 used to support a removable cover 22. Cover 22 comprises a frame of the same general configuration of that of housing 10, but is slightly larger than the open side 16 of the housing in order that the cover may extend beyond the housing at all sides. The brackets 18 and 19 extend beyond the walls of the housing and are flanged at their ends as at 20 and 21, respectively. Suitable fastening means (not shown) are provided so that the cover 22 is secured in spaced relationship with the housing to provide a peripheral opening 23 through which air from the room may be drawn into the housing during the heating and ventilating conditions.

As shown in FIGURE 1, cover 22 has an up-turned marginal flange 24 at each of the four corners of the cover that rests against the surface of the ceiling 17. Between each of the four corners, the cover is spaced from the ceiling to provide a plurality of ventilating openings in communication with the peripheral opening 23 so as to allow air to be drawn into housing 10. Cover 22 is provided with a central opening 25 arranged to be positioned beneath the heating unit to permit heated air to be discharged into the room. For reasons of safety and appearance, it is desirable to cover the central opening 25 of the cover by means of a suitable grille 26 which may be, for example, an open mesh wire screen or a series of louvers.

As will be hereinafter described, the heating and ventilating unit emboding the present invention may include one or more lighting fixtures arranged to transmit light into the room. Accordingly, for such an arrangement, the cover 22 is provided with corresponding openings 27 and glass cover plates 28.

Located within the housing 10 is a supporting asssembly for the heating and ventilating components generally designated as 30. Supporting assembly 30 comprises a central compartment 31 arranged to house a heating unit 32, and two adjacent compartments 33 and 34 for supporting lighting fixtures 35 and 36, respectively. The overall dimensions of the supporting assembly are such that the end walls of the assembly are spaced from the walls of the housing 10 to form a peripheral air inlet passage 37 between the assembly and the housing. In addition, outer compartments 33 and 34 are shorter in length than the central compartment 31 to provide air inlet passages 38 and 39 having a substantially greater open area between the end walls 13 and 14 of the housing and the supporting assembly than that of the peripheral air inlet passage 37. Supporting assembly 30 is open at its lower side and thus forms a box-like shell within which the heating unit 32 and lighting fixtures 35 and 36 are mounted.

The shell 30 is mounted to the housing 10 with its open end facing into the room. To this end, there are conveniently attached to the end walls of the shell threaded studs 40 and 41 adapted to be positioned in slotted supporting brackets 42 and 43, respectively, attached to sides 11 and 12 of the housing 10. Shell 30 is secured in place by means of locking nuts 44 and 45, and is positioned in housing 10 so that it extends below the level surface of the ceiling 17, as more clearly shown in FIGURE 5. In this manner, air being drawn into the housing 10 through the peripheral air inlet passages 23 is caused to be deflected by the walls of the shell into the air inlet passage 37. The depth of the shell 30 is considerably less than that of the housing 10 so that the top wall 46 of the shell is spaced below the top wall 15 of the housing and the air inlet passage 37 opens at its upper end to the interior chamber passage 47 formed between top walls 46 and 15.

A motor driven fan or blower indicated generally at 48 is mounted on the top wall 46 of the shell 30. Such motor driven units are well known in the art and consist of a scroll or volute housing 49 having an air inlet 50 and an air outlet 51 and containing a louvered or cage-type impeller 52. Motor 53 is arranged to drive impeller 52 and is supported centrally within the scroll 49, as shown in FIGURE 4, by means of cross straps 54 and 55 attached to the upper wall of the scroll. Impeller 52 is conveniently secured at its lower end to the shaft of the motor, while the upper wall of the scroll 49 is curved inwardly at the center and open to facilitate air intake. Thus, air entering chamber 47 enters the impeller 52 from the upper end through inlet 50 in the axial direction, and is discharged in a radial direction from the periphery of the impeller through outlet 51.

Positioned adjacent the air outlet 52 of the scroll 49 is the damper assembly generally indicated at 60. Damper assembly 60 includes triangular shaped side walls 61 and 62 and damper supporting wall 63. Damper supporting wall 63 is inclined with respect to the top wall 46 of shell 30 and has a central opening 64 over which is positioned the damper element 65 which is biased so that the damper normally closes the opening 64, with no air flow, and is operable to open the opening in response to the predetermined force of air flow from the blower 48 to direct air through the opening. The back and bottom of the damper assembly 60 are open and positioned over the air outlet 51 of the scroll 49 and on opening 66 in the top wall of the shell 30, respectively. Thus, air discharged radially from the impeller 52 is passed through one of two outlets, depending on the position of the damper.

When the damper is positioned as shown in FIGURE 6, opening 66 is closed and air is diverted to the exhaust conduit 67 connected to a suitable exhaust opening 68 provided in the side wall 11 of the housing 10. As shown in FIGURE 3, housing 10 is provided with suitable side plates 69 and 70 which are adapted to meet with the sides of the inclined damper supporting wall 63 to maintain outlet 64 in registration with the exhaust conduit 67. A plate 71 serves to close off the lower end of the exhaust passage from the air inlet passage 37.

When air is not being discharged from the blower, damper 65 closes outlet 64 and opens the opening 66 in the shell to place the interior of the shell in communication with outlet 51. To this end, damper 65 comprises a substantially L-shaped element which may be formed, for example, from two lightweight pieces of sheet metal joined at right angles.

The first member 72 is advantageously rectangular in shape and overlies the opening 64 in the supporting wall 63. The lower end of the member 72 is reduced in width so as to extend through the opening 66 in the shell and permit the shoulder portions 73 and 74 to ride or pivot on the top wall 46 of the shell 30. Advantageously, the surfaces of the shoulders may be rounded to minimize the resistance to movement of the damper.

The other member 75 is also rectangular in shape and fits into the opening 66 in the shell so as to close the opening. Member 75 is secured in a suitable manner to the lower end of member 72 extending within the interior of the shell. Member 75 is conveniently slotted for supporting a weighted nut 76 which is loosely riveted in the slot 78. An adjusting screw 77 extends through the upper damper member 72 and engages the weighted nut so that the nut may be axially positioned along the slot. In this manner, when the blower is turned off, the damper is biased so that outlet 64 is closed and opening 66 is open, as shown in FIGURE 5. In this position, reverse flow of air from the exhaust conduit 67 into the blower and thence into the room is prevented.

To open the damper, the force of air from the blower must be such as to overcome the biasing force of weighted nut 76. During the heating cycle, the speed of the motor is decreased such that the forced air flow from the blower 48 is insufficient to move the damper 65 away from its normally closed position. Thus, air from the blower scroll 49 passing through air outlet 51 is diverted downwardly through opening 66 in the shell into the interior thereof. However, during the ventilating cycle, the motor 53 is operated at maximum speed. The forced air flow in this case is sufficient to swing the damper 65 to the right, as shown in FIGURE 6, whereby the lower damper member 75 is swung into position closing opening 66 while the upper damper member 72 opens outlet 64. Thus air is directed from the scroll outlet 51 through outlet 64 in the damper assembly 60 and into the exhaust conduit 67 to ventilate the room.

Within the central compartment of shell 30, there is supported the heating unit 32 which comprises a heating element 85 and reflector 86. The heater consists typically of a length of resistance wire mounted on suitable brackets 87 (FIG. 5) which extend across the shell 30 and support the resistance wire in spaced relationship to prevent shorting. Brackets 88 and 89 support the resistance wire adjacent the ends of the reflector to allow a continuous length of wire to be used arranged in a sinuous path. The ends of the resistance wire are connected to conventional binding posts 90 and 91 which are further connected electrically to the energizing source. A suitable tap-off is provided for the heating element intermediate its ends; advantageously at the point where the heating element is supported by one of the brackets. It should be readily apparent that the resistance wire is used only as an example of one of the types of heating elements that may be used.

Reflector 86 is supported between the side walls of the central compartment 31 of the shell 30 by suitable spacers 92 and advantageously is shaped to conform to the shape of the central compartment 31 to thereby define an air passage 93 between the outer walls of the reflector and the inner walls of the compartment through which air entering the compartment 31 from opening 66 may be passed into the room. The reflector 86 has its open side facing downwardly and is supported above the grille 26 while the inside of the reflector is polished to reflect heat downwardly into the room from the heating element.

Since even the most efficient heat reflectors are incapable of reflecting all of the heat produced in the form of radiant heat, a substantial amount of heat accumulation would normally occur between the inner walls of the central compartment 31 and the outer walls of the reflector 86. This heat accumulation, if allowed to exist, would create a substantial safety problem. To avoid such an accumulation, the top wall of the reflector is spaced from the top wall of the central compartment to provide an air passage 94 in communication with the side passage 93. Air entering through opening 66 passes over the back surface of the reflector 86 causing the accumulated warm air to be forced downwardly into the room area through passage 93. Thus, not only is the room heated by means of the radiant heating element 85, but also that portion of the heat which is normally lost through the inefficiency and inability of the reflector to direct all of the radiated heat is utilized to warm the room.

As hereinbefore described, the damper 65 is operable in response to the force of the air flow through the unit which is controlled by varying the speed of the motor during the heating and ventilating conditions. Referring to FIGURE 7, there is shown the electrical schematic diagram illustrating the manner of energization of the components of the heating and ventilating unit of the present invention to effect this control.

Each of the components may be operated from a conventional source of household voltage of 110–120 volts A.C. by means of a suitable switching arrangement 100. The switches may be mounted on a wall panel (not shown) conveniently arranged on a side wall of the room in which the heating and ventilating unit is located so as to be readily accessible for use. Electrical connections from the switches to the individual components of the heating and ventilating unit are made through a terminal board or plug and jack connection mounted in a housing 101 supported in a back corner of the unit, as shown in FIGURE 3.

As shown in FIGURE 7, each of the lighting fixtures 35 and 36 and the heating element 85 are commonly connected at one end to one side of the 120 v. A.C. line through conductor 102. The other sides of the lighting fixtures are commonly connected to the other side of the A.C. line through switch 103. A second switch 104 is arranged to connect one end of the motor winding of motor 53 to the A.C. line, while the other end of the motor winding is connected to a tap 105 on heating element 85. Heating element 85 is connected across the A.C. line through switch 106 which is serially connected to switch 104. A suitable heat indicator light 107 may be provided at the wall panel and arranged to be energized when switches 104 and 106 are closed. If desired, a thermostat 108 may be provided in series with the heating element or preferably arranged as shown in FIGURE 8 to automatically regulate heating of the room.

In operation, closing of switch 103 will enable lighting of the room, while closing of switch 104 energizes the blower motor to ventilate the room. The switches are operated individually and may be closed together to provide both light and ventilation.

When switch 104 is closed, motor 53 is connected across the A.C. line electrically in series with a portion only of the heating element 85. Advantageously, the heating element is tapped so that the portion of the heating element connected electrically in series with the motor comprises approximately ⅓ of the total resistance of the heating element. Since the total resistance of the heating element is small, approximately 8 ohms, in comparison to resistance of the motor winding, approximately 300 ohms, the voltage drop across the portion of the heating element connected in the circuit during the ventilating condition is almost negligible, having a value of approximately one volt. Thus, substantially full line voltage is applied across the motor 53 which is driven at its rated speed of 1600 r.p.m. Since the current drawn by the circuit is very small, the amount of heat radiated from the smaller portion of the heating element is negligible.

In the heating condition, switches 104 and 106 are closed, thus connecting the motor electrically in series with the smaller portion of the heating element and electrically in parallel with the remainder of the heating element. In this condition, approximately ⅓ of the line voltage will be dropped across the smaller portion of the heating element, while the motor will be operated at approximately ⅔ of the line voltage or 80 volts. This reduces the speed of the motor to approximately 1250 r.p.m., which is insufficient to force the weighted damper away from its supporting wall 63 and thus establishes the air flow path for the heating condition through passages 93 and 94 in the manner hereinbefore described.

Thermostat 108 is conveniently located in the room and allows the motor 53 to be run at high speeds during the off cycle. However, it is often desirable to operate both the heating unit and motor under the control of the thermostat so that the motor will always run at low speed during the heating cycle. This may be accomplished by the wiring arrangement shown in FIG. 8.

Each of the lighting fixtures 35 and 36 and the heating element 85 are commonly connected at one end to one side of the 120 v. A.C. line through conductor 102. The other side of the lighting fixtures are connected to the other side of the A.C. line through switch 103. Switch 104 connects one end of the motor winding to the A.C. line, and the other end of the motor winding is connected to the tapped heating element 105 as hereinbefore described. An additional contact 109 is provided on switch 104 to which is connected the other end of the heating element 85 and one side of thermostat switch 108, while the other side of the thermostat switch is connected to the A.C. line through switch 106.

For ventilation, switch 104 is closed, and with switch 106 open, the thermostat has no effect on the operation of the motor. For heating, only switch 106 need be closed and both the heating element 85 and motor 53 are energized in response to the opening and closing of the thermostat 108. Closing of both switch 104 and 106 allows the motor 53 to be operated independently; however, the motor will always run at its low speed condition during the heating cycle.

While the heating element has been illustrated as having only a single tap, several taps may be provided or the heating element may include an adjustable wiper. In this manner, by selectively varying the resistance of the portion of the heating element in series with the motor and adjusting the weighted nut, the optimum operating condition for the unit may be selected.

Although only one particular embodiment of the invention has been described and illustrated, it will be obvious to those skilled in the art that various modifications may be made, such as the use of a spring instead of a weight for biasing the damper toward closed position, and it is therefore intended by the appended claims to cover all such modifications which fall within the true scope of the invention.

What is claimed is:

1. A room heating and ventilating unit comprising in combination a housing having a plurality of passages, one of which is adapted to deliver air into the room, exhaust means connected to another of said passages, an electrical heating element in said housing adapted to be energized for heating the room, a fan and a unidirectional motor for driving said fan disposed in said housing, means for selectively driving said motor at one of two speeds for establishing a predetermined forced air flow through said passages for heating and ventilating the room, and a biased damper movable between a first and a second position and operable in response to the force of the air flow for directing the air flow through a selected one of said passages.

2. The heating and ventilating unit as set forth in claim 1 further including means for selectively connecting said motor in series with a portion of said heating element to a source of line voltage for energizing said motor at approximately full line voltage and electrically in parallel with the remaining portion of said heating element for energizing said motor at a reduced line voltage.

3. The heating and ventilating unit as set forth in claim 2 wherein said means for selectively driving said motor includes manually operable switches for selectively electrically connecting said motor and said heating element to said source of line voltage.

4. A room heating and ventilating unit comprising a housing having a cover plate supported in spaced relationship therewith to provide a peripheral opening through which the air from the room may be drawn into the housing, said cover plate having a central opening through which heated air may be passed out of the housing into the room, an electrical heating element disposed within said housing over said central opening and adapted to be connected to a source of line voltage, a fan and a unidirectional motor for driving said fan disposed within said housing, means for driving said motor at one of two speeds for establishing a predetermined forced air flow through said housing including a switch adapted to be selectively actuated for connecting said motor electrically in series with a portion of said heating element and electrically in parallel with the remainder of said heating element, a plurality of passages in said housing arranged to direct the air flow through said housing, one of said passages being adapted to so direct the air flow that it receives heat from said heating element, an exhaust conduit connected to another of said passages, and means operable in response to the force of the air flow for controlling the direction of air flow through a selected one of said passages.

5. The heating and ventilating unit as set forth in claim 4 wherein the motor is energized at substantially full line voltage when connected to the source in series with said portion of said heating element and at a reduced line voltage when connected in parallel with said remainder of said heating element.

6. The heating and ventilating unit as set forth in claim 11 wherein the motor of said motor driven fan is energized to drive said fan at approximately maximum motor speed when the motor is connected to the source in series with said portion of said heating element and at a reduced speed when connected in parallel with said remainder of said heating element.

7. The heating and ventilating unit as set forth in claim 11 wherein the motor of said motor driven fan is energized at approximately 60% of full line voltage when connected in parallel with said remainder of said heating element.

8. The heating and ventilating unit as set forth in claim 6 wherein the motor of said motor driven fan is energized to drive the fan at a speed of approximately 1600 r.p.m. when the motor is connected to the source in series with said portion of said heating element and at a speed of approximately 1250 r.p.m. when further connected in parallel with said remainder of said heating element.

9. The heating and ventilating unit as set forth in claim 4 wherein said air flow controlling means includes a damper normally biased to close said exhaust conduit and arranged so that the force of said air flow overcomes the bias and opens said exhaust conduit when the motor is energized for ventilating the room.

10. The heating and ventilating unit as set forth in claim 6 wherein said air flow responsive means includes a damper normally biased to close the passage connected to said exhaust conduit and arranged so that said bias is overcome and said exhaust passage is opened when said motor driven fan is driven at maximum motor speed.

11. A room heating and ventilating unit comprising a housing having a cover plate supported in spaced relationship therewith to provide a peripheral opening through which air from the room may be drawn into the housing, said cover plate having a central opening through which heated air may be passed out of the housing into the room, a shell disposed within said housing, the outside walls of said shell and the inside walls of said housing forming a first passage in communication with said peripheral opening for the air being drawn into the housing, an exhaust conduit connected with said first passage, an electrical heating unit including a heating coil and a reflector disposed within said shell and above said central opening, the inner walls of said shell and the outer wall of said reflector forming a second passage connected with said first passage for heated air to be passed out of the housing, a motor driven fan supported in said first passage for establishing a forced air flow through the passages, said motor driven fan being adapted to be connected electrically in series with a portion of said heating element to a source of line voltage for energizing said motor driven fan at approximately full line voltage for ventilating the room and electrically in parallel with the remaining portion of said heating element for energizing said motor driven fan at a reduced line voltage for heating the room, and means responsive to the force of the air flow established by said motor driven fan for controlling the flow of air from said first passage to said second passage and said exhaust conduit.

12. A room heating and ventilating unit comprising a housing having a cover plate supported in spaced relationship therewith to provide a peripheral opening through which the air from the room may be drawn into the housing, said cover plate having a central opening through which air may be passed out of the housing into the room, a first chamber in said housing in communication with the peripheral opening, a second chamber in said housing in communication with the central opening, passage means connecting said first chamber to said second chamber, exhaust means connected to said first chamber, a motor driven fan disposed within said first chamber and adapted to be driven at one of two speeds for establishing a forced air flow through the unit for heating and ventilating the room, an electrical heating coil disposed within said second chamber and adapted to be energized for heating the room, and damper means movably supported in said passage and operable in response to the force of the air flow from said motor driven fan between a first position and a second position for selectively controlling the direction of air flow through said passage means and said exhaust means.

13. A room heating and ventilating unit comprising a housing having a cover plate supported in spaced relation therewith to provide a peripheral opening through which the air from the room may be drawn into the housing, said cover plate having a central opening through which air may be passed out of the housing into the room, a first chamber in said housing in communication with the peripheral opening, a second chamber in said housing in communication with said central opening, passage means connecting said first chamber to said second chamber, exhaust means connected to said first chamber, a motor driven fan disposed within said first chamber and adapted to be driven at one of two speeds for establishing a forced air flow through the unit, an electrical heating coil adapted to be energized for heating the room, said heating coil being disposed within said second chamber and in the path of air flow from said motor driven fan through said passage means and a biased damper operable between a first and a second position in response to the force of the air flow from said motor driven fan for selectively controlling the air flow through said passage means and said exhaust means.

14. A heating and ventilating unit as set forth in claim 13 wherein said damper is supported for movement between a first position wherein said exhaust means is closed and said passage means is open and a second position wherein said exhaust means is open and said passage means is closed, said damper means being normally supported in said first position for closing said exhaust means when said motor driven fan is deenergized.

15. A room heating and ventilating unit comprising a housing having a cover plate supported in spaced relationship therewith to provide a peripheral opening through which air from the room may be drawn into the housing, said cover plate having a central opening through which air may be passed out of the housing into the room, an inner compartment disposed within said housing, said inner compartment having an open side facing the central opening, the outer walls of said inner compartment and the inner walls of said housing forming a first passage in communication with the peripheral opening, exhaust means adapted to be placed in communication with said first passage, an electrical heating unit in said inner compartment, the outer wall of said heating unit and the inner walls of said compartment forming a second passage for air to be passed out of the housing, a motor driven fan supported in said first passage, means for varying the energization of said motor driven fan for establishing a controlled forced air flow through the passages for heating and ventilating the room, and means operable in response to the controlled air flow from said motor driven fan for directing the air flow through the exhaust means when said motor driven fan is energized for ventilating and through the second passage when said motor driven fan is energized for heating.

16. The heating and ventilating unit as set forth in claim 15 wherein said air flow directing means comprises a biased damper having a first element and a second element normally arranged, respectively, for closing said exhaust means and opening said second passage to said first passage, said biased damper being arranged for displacement when said motor driven fan is energized for ventilating the room to open said exhaust means and close said second passage to said first passage, and to close said exhaust means and open said second passage to said first passage when said motor driven fan is energized for heating the room.

17. A room heating and ventilating unit comprising a housing having a cover plate supported in spaced relationship therewith to provide a peripheral opening through which air from the room may be drawn into the housing, said cover plate having a central opening through which air may be passed out of the housing into the room, an inner compartment disposed within said housing, the outer walls of said inner compartment and the inner walls of said housing forming a first passage in communication with the peripheral opening, exhaust means adapted to be placed in communication with said first passage, an electrical heating unit in said inner compartment, the outer walls of said heating unit and the inner walls of said compartment forming a second passage for heated air to be passed out of the housing, an opening in one of the inner walls of said compartment for connecting said first passage to said second passage, said heating unit being arranged to be energized for heating the room, a motor driven fan supported in said first passage and adapted to be energized for establishing a controlled forced air flow through the passages for heating and ventilating the room, and a biased damper movable in response to the controlled forced air flow between a first and a second position, said damper including a pair of air deflecting baffles arranged for closing said exhaust means and opening said connecting opening in the first position and opening said exhaust means and closing said connecting opening in the second position.

References Cited by the Examiner

UNITED STATES PATENTS

| 2,133,188 | 10/1938 | Conforti | 219—220 |
|---|---|---|---|
| 2,583,754 | 1/1952 | Theisen | 219—369 X |
| 2,647,198 | 7/1953 | Lautner | 219—369 X |
| 2,870,319 | 1/1959 | Ford | 219—363 |
| 2,875,316 | 2/1959 | Ford et al. | 219—368 X |
| 3,097,287 | 7/1963 | Knoll et al. | 219—375 X |

RICHARD M. WOOD, *Primary Examiner.*

C. L. ALBRITTON, *Assistant Examiner.*